United States Patent
Lievens et al.

(10) Patent No.: US 8,057,695 B2
(45) Date of Patent: Nov. 15, 2011

(54) ANTIFREEZE CONCENTRATE AND COOLANT COMPOSITIONS AND PREPARATION THEREOF

(75) Inventors: Serge S. Lievens, Merelbeke (BE); Jurgen P. De Kimpe, Ghent (BE)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/868,920

(22) Filed: Aug. 26, 2010

(65) Prior Publication Data

US 2010/0320415 A1 Dec. 23, 2010

Related U.S. Application Data

(62) Division of application No. 12/463,244, filed on May 8, 2009, now abandoned.

(51) Int. Cl.
*C09K 5/00* (2006.01)
(52) U.S. Cl. .................. 252/71; 252/73; 252/74; 252/75
(58) Field of Classification Search .................. None
See application file for complete search history.

(56) References Cited

U.S. PATENT DOCUMENTS

| | | | | |
|---|---|---|---|---|
| 5,997,763 | A | * | 12/1999 | Pabon et al. ................... 252/79 |
| 6,080,331 | A | * | 6/2000 | Meszaros et al. .............. 252/79 |
| 6,398,984 | B1 | * | 6/2002 | Maes et al. ................... 252/387 |
| 6,802,988 | B1 | * | 10/2004 | Wenderoth et al. ............ 252/73 |

* cited by examiner

*Primary Examiner* — Necholus Ogden, Jr.
(74) *Attorney, Agent, or Firm* — Penny L. Prater

(57) ABSTRACT

A toxicological friendly antifreeze composition having improved thermal stability is provided. In one embodiment, the antifreeze composition comprises from 5 to 80 wt. % of an aqueous freezing point depressant selected from alkali metal salts of acetates, formates, proprionates, adipiates, and succinates, and mixtures thereof; 0.1 to 10 wt. % of at least one of a 2-ethylhexanoic acid, isononanoic acid and 3,5,5-trimethylhexanoic acid; and 0.1 to 10 wt. % of at least one of octanoic acid, nonanoic acid, decanoic acid, undecanoic acid, dodecanoic acid, neodecanoic acid, benzoic acid, 2-hydroxybenzoic acid, p-terbutylbenzoic acid, and mixtures thereof. In one embodiment, the composition is employed as a concentrate in admixture with 10 to 90 wt. % water. The composition may be totally free of glycol, or, in an alternate embodiment, possess a glycol:non-glycol base ratio of 1:2 to 1:20.

4 Claims, No Drawings

ANTIFREEZE CONCENTRATE AND COOLANT COMPOSITIONS AND PREPARATION THEREOF

REFERENCE TO RELATED APPLICATIONS

This application is a divisional of application Ser. No. 12/463,244 now abandoned and claims priority there from. It is related to copending application Ser. No. 11/769,960. Pending claims are the not elected Group II of Ser. No. 12/463,244.

TECHNICAL FIELD

The invention relates generally to antifreeze compositions exhibiting improved thermal stability at low temperatures.

BACKGROUND

It is known to use antifreeze compositions in heat exchanging systems and/or for de-icing applications. In these applications, the antifreeze compositions come in contact with various metals, alloys, and other components forming the different parts of the heat exchanging system or the system to be de-iced. Efforts have been made towards the protection from corrosion of parts and components in contact with the antifreeze compositions. Prior art solutions include the addition of various corrosion inhibitors and/or the use of different organic acids for multiple metal protection systems.

Corrosion protection is critical at all temperature ranges. However, at low temperatures, other factors important to the performance of antifreeze compositions come into play, including the unwanted formation of scale and/or deposits. Water is often used to dilute antifreeze compositions. Water quality varies greatly with geographic location, population and degree of industrialization. When hard water is used, scales can be formed from alkaline earth metal carbonate and phosphate deposition. These inorganic films tend to inhibit thermal transfer and thus reduce the heat transfer efficiency of the system. Besides the use of hard water, the use of certain corrosion inhibitors contributes to the formation of deposits, e.g., silicate gellation. In certain additive packages for coolants, silicate/phosphate corrosion inhibitors are used to help protect metal cooling system parts and also as a buffer to control the pH of the antifreeze. When a composition containing silicates/phosphates is mixed with hard water, copious precipitates develop in a short period of time. These precipitates may clog a cooling system, resulting in reduced antifreeze/coolant flow, increased engine operating temperatures and shorter service life. Deposit formation can also result in the physical damage of soft material parts, e.g., water pump seals, engine head seals, hoses, etc. used in the parts and components of the system.

To alleviate the silicate deposit problem, silicate stabilizers can be added to antifreeze compositions. However, at low operating temperatures, e.g., sub-freezing, some additives are not soluble thus further compounding the problem. Ideally, antifreeze compositions should remain transparent and free of insoluble materials in operation as the unwanted formation of deposits/soluble materials decreases the heat transfer property of the composition. And ideally, the antifreeze composition should be environmentally and toxicological friendly.

There is still a need for a toxicological friendly antifreeze composition, i.e., a non-glycol based composition having improved thermal stability at low temperatures with minimal salt/deposition formation.

BRIEF DESCRIPTION OF THE PRIOR ART

There are many antifreeze compositions which recite the presence of alkylene glycol. U.S. Pat. No. 5,997,763 discloses an antifreeze concentrate made by adding together at least:
a) an alkylene glycol;
b) an effective corrosion inhibiting amount, or more, of an unsubstituted benzoic acid; and
c) an effective corrosion inhibiting amount, or more, of a $C_7$-$C_{14}$ monocarboxylic acid.

This formulation is particularly effective at inhibiting corrosion in coolants which are free of borates, primary and secondary amines, phosphates, silicates, as well as those coolants which are free of p-tertbutyl benzoic acid.

U.S. Pat. No. 6,080,331 is directed to a silicate-, borate- and nitrate-free antifreeze concentrate which is based on alkylene glycols or derivatives thereof and consists essentially of: (a) from 0.05 to 10% by weight, based on the total amount of concentrate, of a mixture of two monocarboxylic acids each of 3 to 16 carbon atoms in the form of their alkali metal salts, ammonium salts or substituted ammonium salts, the first acid being an aliphatic monocarboxylic acid, and the second acid being a hydroxy aromatic monocarboxylic acid, selected from the group consisting of o-, m- or p-hydroxybenzoic acid and o-, m- or p-(hydroxymethyl)benzoic acid, and (b) from 0.01 to 3% by weight, based on the total amount of concentrate, of at least one hydrocarbon-triazole and/or hydrocarbon-thiazole.

U.S. Pat. No. 6,398,984 is directed to corrosion inhibitor formulation comprising, in a preferred embodiment alkylene glycols such as ethylene or propylene glycol as freezing point depressants.

SUMMARY OF THE INVENTION

In one embodiment, there is provided an antifreeze composition comprising from 50 to 99.8 wt. % of a freezing point depressant comprising at least one of an aqueous medium alkali metal salt of anions selected from acetates, formats, proprionates, adipiates, and succinates; 0.1 to 5 wt. % of at least a branched organic acid ($C_5$-$C_{16}$) or alkali- or amino salt of a branched organic acid ($C_5$-$C_{16}$); and 0.1 to 5 wt. % of i) an aliphatic mono acid ($C_5$-$C_{12}$) or alkali- or amino salt of an aliphatic mono acid ($C_5$-$C_{12}$); or ii) an aromatic organic acid ($C_7$-$C_{18}$) or alkali- or amino salt of an aromatic organic acid ($C_7$-$C_{18}$); iii) a substituted aromatic organic acid ($C_7$-$C_{18}$) or alkali- or amino salt of a substituted aromatic organic acid. In one embodiment, the composition is employed as a concentrate, in admixture with an aqueous antifreeze solution comprising 10 to 90 wt. % by weight of water.

In another aspect, there is provided an antifreeze concentrate composition comprising 50 to 99.8 wt. % of a freezing point depressant selected from the group of alkali metal salts of anions selected from acetates, formats, proprionates, adipiates, and succinates and mixtures thereof; 0.1 to 10 wt. % of at least one of a 2-ethylhexanoic acid, isononanoic acid and 3,5,5-trimethylhexanoic acid; and 0.1 to 10 wt. % of at least one of heptanoic acid, octanoic acid, nonanoic acid, decanoic acid, undecanoic acid, dodecanoic acid, neodecanoic acid, benzoic acid, 2-hydroxybenzoic acid, p-terbutylbenzoic acid, and mixtures thereof.

There is also provided a method to improve the thermal stability of an antifreeze composition comprising blending into the freezing point depressant matrix of an antifreeze composition a corrosion inhibitor system comprising: a) 0.1 to 10 wt. % of at least a branched organic acid ($C_5$-$C_{16}$) or alkali- or amino salt of a branched organic acid ($C_5$-$C_{16}$); and b) 0.1 to 10 wt. % of i) an aliphatic mono acid ($C_5$-$C_{12}$) or alkali- or amino salt of an aliphatic mono acid ($C_5$-$C_{12}$); or ii) an aromatic organic acid ($C_7$-$C_{18}$) or alkali- or amino salt of an aromatic organic acid ($C_7$-$C_{18}$); iii) a substituted aromatic organic acid ($C_7$-$C_{18}$) or alkali- or amino salt of a substituted aromatic organic acid.

DETAILED DESCRIPTION

Definitions for the following terms are provided herein to promote a further understanding of the invention.

The term "antifreeze" refers to a composition which reduces the freezing point of an aqueous solution, or is an aqueous solution with a reduced freezing point with respect to water, e.g., a composition comprising a freezing point depressant.

The term "coolant" refers to a category of liquid antifreeze compositions which have properties that allow an engine to function effectively without freezing, boiling, or corrosion. The performance of an engine coolant must meet or exceed standards set by the American Society for Testing and Materials (A.S.T.M.) and the Society of Automotive Engineers (S.A.E.).

The term "heat transfer fluid" refers to a fluid which flows through a system in order to prevent its overheating, transferring the heat produced within the system to other systems or devices that can utilize or dissipate the heat.

The term "de-icing" fluid refers to a fluid which makes or keeps a system, a device, or a part free of ice, or a fluid which melts ice.

As used herein, the term "antifreeze" composition (or fluid or concentrate) may be used interchangeably with "heat transfer," "coolant," or "de-icing" fluid (composition or concentrate).

In one embodiment of the invention, an antifreeze composition with excellent thermal stability properties is provided. The composition remains relatively clear with minimal deposit formation (that can be visually observed). The composition comprises a combination of corrosion inhibitors in a non-glycol based freezing point depressant.

Non-Glycol Based Freezing Point Depressant Matrix: In one embodiment, the freezing point depressant matrix is free of glycol and consists of at least an aqueous medium alkali metal salt of anions selected from acetates, formats, proprionates, adipiates, and succinates, in an amount of 50 to 99.8 wt. % of total weight of a final concentrate composition. In one embodiment, the composition is in admixture with an aqueous antifreeze solution comprising 10 to 90 wt. % by weight of water. Suitable examples include but are not limited to potassium formate, potassium propionate, potassium acetate, dipotassium adipinate, and mixtures thereof.

In one embodiment, the matrix further comprises additional water soluble organic compounds such as formamide and/or urea, containing an intensively hydrophilic substituent, for an extreme reduction in freezing point. In another embodiment, some glycol may be added to the non-glycol freezing point depressant for a matrix with a glycol:non-glycol base ratio of 1:2 to 1:20.

In one embodiment, the non-glycol matrix is a mixture of some, if not all the alkali metal salts described above. For some combinations/mixtures, e.g., acetates and formates, the combinations result in an extreme reduction in freezing point which is not even approached when the individual alkali metal salt components are employed. For example, a concentrate aqueous solution of potassium acetate (40:0) has a freezing point of −38° C., a potassium formate (40:0) in water solution freezes at −35° C. If these two potassium compounds are "dissolved" in water in combination with each other, a composition is obtained that is liquid at −70° C. A concentrate sodium proprionate (40:0) in water has a freezing point of −32° C. A mixture of sodium proprionate and potassium formate (at a ratio 20:20) in water has a freezing point of −48° C., which is remarkably lower than the expected mid-point of −34° C. calculated using the addition rule.

In one embodiment, potassium formate is used as the freezing point depressant. In a second embodiment, a mixture of potassium formate and potassium propionate is employed in the matrix for a formate:propionate ratio of 1:5 to 1:20. In a third embodiment, a mixture of potassium acetate and monoethylene glycol is employed in the matrix. In yet a fourth embodiment, dipotassium adipinate is used as the freezing point depressant. In a fifth embodiment, the non-glycol matrix comprises a mixture of potassium succinate and sodium polyaspartate in a ratio of 90:10 to 99:1.

In one embodiment, the non-glycol matrix component comprises >40 wt. % of alkali metal acetates or formates. In yet another embodiment, the matrix has a formate-acetate anion concentration ratio of 1:6, when diluted with water (for a water content of 65 wt. %), the matrix has a freezing point of −25° C., and −80° C. when diluted with water for a 30 wt. % water content.

Corrosion Inhibitors System: The antifreeze composition further comprises a combination of: a) 0.1 to 10 wt. % of one or more branched organic acids ($C_5$-$C_{16}$) or alkali- or amino salt of the branched organic acids as a first component; and b) 0.1 to 10 wt. % of one or more linear aliphatic mono- or di-basic acids ($C_5$-$C_{12}$), aromatic organic acids ($C_7$-$C_{18}$), or substituted aromatic organic acids ($C_7$-$C_{18}$) or alkali- or amino salt of the foregoing acids as a second component. The combination improves the thermal stability of the antifreeze compositions as compared to prior art compositions that contain only aliphatic organic acids or substituted aromatic acids.

In one embodiment, the first component comprising at least one of branched organic acids, salts of branched organic acids, and mixtures thereof. Examples include but are not limited to the following branched $C_4$-$C_{18}$-carboxylic acids and salts thereof: isobutanoic acid, 2-ethylhexanoic acid, isononanoic acid and 3,5,5-trimethylhexanoic acid. In one embodiment, the branched organic first component is 2-ethylhexanoic acid or 3,5,5-trimethylhaxanoic acid.

In one embodiment, the second component is selected from the group of aliphatic mono acids; aliphatic dibasic acids; aromatic organic acids; substituted aromatic organic acids; alkali metal, ammonium, or amine salt of the aforementioned acids; and mixtures thereof.

In one embodiment, the aliphatic mono acid component includes at least a $C_5$-$C_{12}$ aliphatic monobasic acid or the alkali metal, ammonium, or amine salt thereof. Examples of the acids or isomers include but are not limited to octanoic, nonanoic, decanoic, undecanoic and dodecanoic, and mixtures thereof. Any alkali metal, ammonium, or amine can be used to form the monobasic acid salt. In one embodiment, the second component comprises at least an alkali metal of the aliphatic mono acids with sodium and potassium being used as the alkali metals for use in forming the monobasic acid salt. In another embodiment, octanoic acid is used as the second component.

In one embodiment, the dibasic acid component includes at least a hydrocarbyl $C_5$-$C_{12}$ dibasic acid or the alkali metal, ammonium, or amine salt of such dibasic acid. Examples include but are not limited to suberic, sebacic, undecanedioic, dodecanedioic, malonic, succinic, glutaric, adipic, pimelic, azelaic, undecanedioic acid, dodecanedioic, dicyclopentadienedicarboxylic, phthalic, terephthalic and mixtures thereof. In one embodiment, the second component comprises at least an alkali metal of the dibasic acid with sodium and potassium being used as the alkali metals for use in forming the acid salt. In a second embodiment, sebacic acid is used as the second component.

Examples of aromatic organic acids and hydroxyl-substituted aromatic organic acids include but not limited to benzoic acids, $C_1$-$C_8$-alkylbenzoic acids/salts thereof, for example o-, m- and p-methylbenzoic acid or p-tert-butylbenzoic acid, $C_1$-$C_4$-alkoxybenzoic acids, for example o-, m- and p-methoxybenzoic acid, hydroxyl-containing aromatic monocarboxylic acids, for example o-, m- or p-hydroxybenzoic acid, o-, m- and p-(hydroxymethyl)benzoic acid, and halobenzoic acids, for example o-, m- or p-fluorobenzoic acid. In one embodiment, the aromatic organic acid is selected from 2-hydroxybenzoic acid, p-terbutylbenzoic acid, mandelic acid and homophthalic acid and salts thereof.

In one embodiment, the carboxylic acids mentioned are present as alkali metal salts, e.g., sodium or potassium salts, or as ammonium salts or substituted ammonium salts (amine salts), for example with ammonia, trialkylamines or trialkanolamines.

In one embodiment, the approximate proportions (based on the amount of the water non-glycol freezing point depressant present) of the combination package are about 0.1 to 15.0 wt. % of the first component and about 0.1 to 15.0 wt. % of the second component. In a second embodiment, the amount of either the first or the second component is in the range of 0.1 to 5 wt. %. In a third embodiment, either component is present in an amount of 0.5 to 3 wt. %. In a fourth embodiment, the system comprises 1-3 wt. % of the first component and 1-3 wt. % of the second component, with the ratio of the first to the second component in the range of 3:1 to 1:3.

In one embodiment and after being diluted with water, the antifreeze composition comprises 1 to 3 wt. % of a branched acid selected from 2-ethylhexanoic acid and 3,5,5-trimethylhexanoic acid; 1 to 3 wt. % of at least one of: benzoic acid, octanoic acid, p-tertbutylbenzoic acid, adipic acid, sebacic acid, and mixtures thereof, in a matrix of 40-55 wt. % (based on the final weight of the diluted composition) of at least one of potassium format, potassium propionate, potassium acetate, dipotassium adipinate, and mixtures thereof. In yet another embodiment, the diluted composition comprises about 40-50 wt. % of at least a non-glycol freezing point depressant material, 1-2 wt. % 2-ethylhexanoic acid and 1-2 wt. % 3,5,5-trimethylhexanoic acid.

Additional/Optional Components: In one embodiment, the antifreeze composition further comprises one or more additional conventional corrosion inhibitors in combination with the above-described components, at concentrations of 0.01-5.0 wt. % (based on the weight of the non-glycol freezing point depressant matrix). Examples of optional conventional corrosion inhibitors include alkali metal borates, alkali metal silicates, alkali metal benzoates, alkali metal nitrates, alkali metal nitrites, alkali metal molybdates, and hydrocarbyl thiazoles. In one embodiment, the additional corrosion inhibitor is selected from hydrocarbyl triazoles, hydrocarbyl thiazoles, sodium metasilicate pentahydrate, organosilane stabilizers, and mixtures thereof. Suitable hydrocarbyl triazoles include aromatic triazoles or alkyl-substituted aromatic triazoles, e.g., benzotriazole or tolyltriazole, at a concentration of 0.1-0.5 wt. % and combinations thereof. In yet another embodiment, the antifreeze composition comprises 0.2 to 5 wt. % of a sulfite or an alkali metal salt of sulfurous acid as an additional corrosion inhibitor.

In one embodiment, the antifreeze composition further contains other additives in an amount of 0.05 to about 0.1 wt. % (based on the weight of the non-glycol freezing point depressant matrix) such as antioxidants, anti-wear agents, detergents, antifoam agents, acid-base indicators, dyes and the like, provided that the additives are soluble and thermally stable at low temperatures.

Examples of antifoam agents include but are not limited to polyalkylene oxide having a molecular weight of from about 1,000 to about 4,000; silicone oils such as dimethylpolysiloxane; and organic silicon compounds such as diethyl silicates.

Examples of antioxidants include but are not limited to phenols, such as 2,6di-t-butyl methylphenol and 4,4'-methylene-bis(2,6-di-t-butylphenol); aromatic amines, such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthatalamines and alkyl-phenyl-2-naphthal-amines, as well as sulphur-containing compounds, e.g. dithiophosphates, phosphitest, sulphides and dithio metal salts, such as benzothiazole, tin-dialkyldithiophosphates and zinc diaryldithiophosphates.

Examples of antiwear agents include but are not limited to phosphates, phosphate esters, phosphites, thiophosphites, e.g. zinc dialkyl dithiophosphates, zinc diaryldithiophosphates, tricresyl phosphates, chlorinated waxes, sulphurised fats and olefins, such as thiodipropionic esters, dialkyl sulphides, dialkyl polysulphides, alkyl-mercaptanes, dibenzothiophenes and 2,2'-dithiobis(benzothiazole); organic lead compounds, fatty acids, molybdenum complexes, such as molybdenum disulphide, halogen substituted organosilicon compounds, organic silicon compounds, borates and halogen-substituted phosphorus compounds.

Examples of detergents include but are not limited to sulphonates, aromatic sulphonic acids, which are substituted with alkyl having a long chain, phosphonates, thiophosphonates, phonolates, metal salts of alkylphenols, and alkyl sulphides.

In one embodiment, a sufficient amount of at least a base, e.g., NaOH is added to the composition to modify the pH of the formulation to between 7 and 10. In yet another embodiment, a sufficient amount of at least a base is added for the pH to be between 7 and 9.

Method for Making: The corrosion inhibitor combination, optional additives, optional glycol depressant can be blended into the non-glycol based freezing point depressant matrix individually or in various sub-combinations to formulate the antifreeze composition. Depending on the amount of freezing point depressant used, the composition can be in the form of a "concentrate," which can be used as is or to be further diluted.

In one embodiment, an anti-freeze concentrate with 50-90 wt. % of aqueous freezing point depressant is further diluted with about 10-90 vol. % water prior to being used in cooling system or as an anti-freeze/de-icing fluid. In a second embodiment, the anti-freeze composition is diluted with 25 to 60 vol. % water. In a third embodiment, the amount of water added is between 30% to 50 wt. %. In a fourth embodiment, water is added to the antifreeze concentrate for a composition comprising 3 to 9 parts by weight water, from 1 to 2 parts by weight potassium formate, from 1 to 9 parts by weight potassium acetate, optionally up to 1.5 parts by weight urea and optionally up to 1.5 parts by weight of a glycol, and 1 to parts by weight of the corrosion inhibitor combination.

Properties: In one embodiment with a non-glycol material for the freezing point depressant matrix, the antifreeze composition provides improved heat transfer properties and lower viscosities (as compared to a glycol-based system) for the same level of frost protection. The composition is characterized as exhibiting excellent protection against the corrosion of metals. The composition is further characterized as being thermally stable.

As used herein, "thermally-stable" means a sample of the antifreeze composition forms less than 2% precipitate when chilled at 0° C. for at least 24 hours. In another embodiment, the term means that the composition is relatively free of precipitates (as visually observed) after being chilled at −15° C. for at least 24 hours. In yet another embodiment, "thermally-stable" means that less than 2% of the composition forms precipitates when chilled at −15° C. for at least 24 hours. In a third embodiment, the term means that less than 1% of the composition forms precipitates when chilled at −15° C. for at least 24 hours. In a fourth embodiment, the composition forms less than 1 wt. % precipitates when chilled at −25° C. for at least 24 hours. As used herein, "precipitate" means broadly to include insolubles, coagulants, flocculants, solids and/or fine particles, needles (from crystallization), crystals, gels, colloidal formations, aggregated or precipitated lumps, clusters, or granules which may suspend, deposit, or settle in the antifreeze composition.

In one embodiment, the composition further exhibits improved thermal stability properties compared to the compositions of the prior art, wherein the composition remains relatively free of insolubles/precipitates at a freezing or sub-freezing temperature and after a period of at least 24 hours. In one embodiment, the composition remains relatively transparent after at least 24 hours at a temperature of less than 0° C. In one embodiment, the composition remains thermally stable at a temperature of less than −5° C. In a second embodiment, the composition remains thermally stable at a temperature of less than −10° C. In a third embodiment, the composition remains thermally stable at a temperature of less than −20° C.

Applications: Due to the thermal stability of the fluids and the excellent protection provided by the corrosion inhibitors, the antifreeze composition is especially useful in applications where it is desirable to provide long service life with minimal fluid change-outs or fluid modifications once in service. In one embodiment, the antifreeze composition is used in applications in which heat is to be supplied to petroleum materials drilled or transported in cold climates to improve the fluidity and decrease the viscosity of the petroleum materials. In another embodiment, the composition is also useful in conventional applications for heat transfer fluids, such as coolants in industrial engines.

In one embodiments for an environmentally friendly composition with a glycol free/non-glycol matrix, the composition can be used in operating cooling towers of thermal power stations, industrial and household refrigerators and freezers, open and closed heat exchangers, solar collectors, doublers and autoclaves used in the chemical industry, generally providing equipment with protection against frost damage in case of freezing, and in the foodstuffs sector for indirect cooling (e.g., freeze-drying, deep-freeze cabinet). In yet another embodiment, the composition can also be used in de-icing applications for melting ice away from aircrafts, equipment, etc.

The following Examples are given as non-limitative illustration of aspects of the present invention.

EXAMPLES

Unless specified otherwise, the compositions are prepared by mixing the components in the amounts indicated in Table 2. The components used in the Examples and the corresponding "code" in Table 1 are listed below. All components are commercially available from a number of sources.

Octanoic acid: C8.
2-ethylhexanoic acid: 2-eha.
3,5,5-trimethylhexanoic acid (Cekanoic acid): TMHA.
Sebacic acid: C10b.
Adipic acid: C6b.
Benzoic acid: BA.
p-tertButylbenzoic acid: PTBA.
Potassium format (KFormate), potassium propionate (Kpropionate), potassium acetate (KAcetate), and dipotassium adipinate: non-glycol-based freezing point depressants used in the Examples.
Mono ethylene glycol (MEG): optional glycol-based freezing point depressant used in some of the Examples.

The antifreeze compositions were placed in glass vials and placed in climate chambers maintained at the specified temperatures in the Table. After 24 hours, the glass vials were taken out and visually assessed. Observations about the liquid samples in the examples (as indicated in the Table) were made according to the guidelines in Table 1

TABLE 1

| | | Coding Showing Precipitates | | |
| --- | --- | --- | --- | --- |
| | | Not present | Trace | Moderate | Severe |
| Haziness | H | — | TH | MH | SH |
| Gel formation | G | — | TG | MG | SG |
| Flocculation | F | — | TF | MF | SF |
| Needles | N | — | TN | MN | SN |
| Precipitation | P | — | TP | MP | SP |

If the liquid is observed to be slightly hazy, a code of "TH" is used. If the liquid is very hazy with trace of precipitate, then "SH+TP" is used. If the liquid is clear, but needles are observed inside (more than just a few) then a code "MN" is used. If the liquid is slightly hazy, with a lot of gel on the glasswall, and with a trace of flocculation, combinations of codes can be used, e.g., "TH+SG+TF." Lastly, if the liquid is clear (no instability) then the "OK" code is used.

In examples 1-13, each antifreeze composition employs 43 wt. % potassium formate (based on the final weight on the composition), the organic acid content in wt. % as specified in the table, a sufficient amount of KOH for the sample pH to be between 10.8 and 11.2, and the remainder water. In examples 14-35, each example employs 22 wt. % potassium formate (based on the final weight of the composition), 16 wt. % potassium propionate, specified organic acid contents, a sufficient amount of KOH for the sample pH to be between 9.8 and 10.2, and water. In examples 36-64, each example employs 21 wt. % potassium acetate (based on the final weight on the composition), 28 wt. % Mono ethylene glycol (MEG), specified organic acid contents, a sufficient amount of KOH for the sample pH to be between 8.8 and 9.2, and water. In examples 65-93, each example employs 22.8 wt. % dipotassium adipinate (based on the final weight of the composition), specified organic acid contents, a sufficient amount of KOH for the sample pH to be between 9.8-10.2, and water.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

All citations referred herein are expressly incorporated herein by reference.

TABLE 2

| Ex. | Organic acid content | 20° C. | 10° C. | 5° C. | 0° C. | −5° C. | −10° C. | −15° C. | −20° C. | −25° C. | −30° C. | −35° C. |
|---|---|---|---|---|---|---|---|---|---|---|---|---|
| 1 | 3 w % C8 | OK | SF | SF | SF | SF | SF | SF | SF | SF | SF | SF |
| 2 | 3 w % 2-eha | TP | TP | TP | TP | TP | TP | SF | SF | SF | SF | SF |
| 3 | 3 w % TMHA | MF | MP | MP | MP | MP | MP | MP | MF | MP | SF | SF |
| 4 | 3 w % C10b | SP | SP | SP | SP | SP | SP | SP | SP | SP | SP | SP |
| 5 | 3 w % C6b | OK | TP | TP | TP | TP | TP | TP | MP | TP | TP | OK |
| 6 | 3 w % BA | SF | SF | SF | SF | SF | SF | SF | SF | SF | SF | SF |
| 7 | 3 w % PTBA | SN | SN | SN | SN | SN | SN | SF | SF | SF | SF | SF |
| 8 | 2 w % C8 + 1 w % 2-eha | OK | TP | TP | SF | SF | SF | SF | SF | SF | SF | SG |
| 9 | 1 w % C8 + 2 w % 2-eha | OK | OK | OK | OK | TP | MP | MP | MP | MP | MP | SG |
| 10 | 2 w % C6b + 1 w % 2-eha | OK | OK | OK | OK | TP | MP | MP | MP | MP | MP | TG |
| 11 | 1 w % C6b + 2 w % 2-eha | OK | OK | TP | TP | TP | MP | MP | MP | SF | SF | SG |
| 12 | 1 w % BA + 2 w % 2-eha | TP | TP | TP | TP | TP | MP | SF | SF | SF | SF | SP |
| 13 | 1 w % PTBA + 2 w % 2-eha | TP | TP | TP | TP | TP | MP | SN | SN | SF | SF | SF |
| 14 | 3 w % Octanoic acid (C8) | OK | TP | MP | MP | TP | TP | SF | SF | SF | SF | SF |
| 15 | 3 w % 2-eha | OK | TP | TP | TP | TH | TH | TH | TH | TP | TP | TP |
| 16 | 3 w % TMHA | OK | TH | OK | OK | TP | TP | TP | TP | TP | TP | SF |
| 17 | 3 w % Sebacic acid (C10b) | SP | SP | SP | SP | SP | SP | SP | SP | SP | SF | SF |
| 18 | 3 w % Adipic acid (C6b) | OK | MP | MP | MP | TP | MP | TP | TP | TP | TP | TP |
| 19 | 3 w % Benzoic acid (BA) | SF | SF | SF | SF | SF | SF | SF | SF | SF | SF | SF |
| 20 | 2 w % C8 + 1 w % 2-eha | OK | TH | TH | TP | TH | TP | TP | TP | SF | SF | SF |
| 21 | 1 w % C8 + 2 w % 2-eha | TH | TP | TP | TP | TH | TP | TP | TP | TP | TP | TP |
| 22 | 1 w % C10b + 2 w % 2-eha | MP | MF | SF | SF | SF | SF | SF | SF | SF | SF | SF |
| 23 | 2 w % C6b + 1 w % 2-eha | TH | MP | MP | MP | TH | MP | MP | MP | TP | TP | TP |
| 24 | 1 w % C6b + 2 w % 2-eha | TH | TP | TP | TP | TH | MP | TP | TP | TP | TP | TP |
| 25 | 2 w % BA + 1 w % 2-eha | TH | TP | MP | MP | SF | SF | SF | SF | SF | SF | SF |
| 26 | 1 w % BA + 2 w % 2-eha | H | TH | OK | OK | TH | TP | TP | TP | TP | TP | TP |
| 27 | 2 w % C8 + 1 w % TMHA | OK | OK | OK | OK | TP | TP | TP | TP | SF | SF | SF |
| 28 | 1 w % C8 + 2 w % TMHA | OK | OK | TP | TP | TP | TP | TP | TP | TP | TP | SF |
| 29 | 1 w % C10b + 2 w % TMHA | TH | MP | TP | TP | TP | MF | SF | SF | SF | SP | SP |
| 30 | 2 w % C6b + 1 w % TMHA | TH | TP | TP | TP | TP | TP | TP | TP | TP | TP | SH |
| 31 | 1 w % C6b + 2 w % TMHA | OK | OK | OK | OK | TP | TP | TP | TP | TP | SP | SF |
| 32 | 2 w % BA + 1 w % TMHA | TH | TP | TP | SF | SF | SF | SF | SF | SF | SF | SF |
| 33 | 1 w % BA + 2 w % TMHA | OK | TH | TP | MP | TP | TP | TP | TP | SF | SF | SF |
| 34 | 2 w % 2-eha + 1 w % TMHA | TH | TP | TP | TP | TH | TP | TP | TP | TP | TP | TP |
| 35 | 1 w % 2-eha + 2 w % TMHA | OK | TH | OK | OK | TP | OK | OK | TH | TH | TP | TP |
| 36 | 3 w % Octanoic acid (C8) | OK | OK | OK | OK | OK | OK | OK | OK | OK | SF | SF |
| 37 | 3 w % 2-eha | OK | OK | OK | OK | TP | TP | TP | TP | TP | TP | TP |
| 38 | 3 w % TMHA | OK | OK | OK | OK | OK | OK | OK | OK | OK | OK | OK |
| 39 | 3 w % Sebacic acid (C10b) | OK | OK | OK | SF | SF | SF | SF | SF | SF | SF | SF |
| 40 | 3 w % Adipic acid (C6b) | TP | TP | TP | TP | TP | TP | TP | TP | TP | TP | TP |
| 41 | 3 w % Benzoic acid (BA) | OK | OK | OK | OK | OK | OK | OK | OK | OK | OK | OK |
| 42 | 3 w % PTBA | SF | SF | SF | SF | Solid |  | Solid | Solid | Solid | Solid | Solid |
| 43 | 2 w % C8 + 1 w % 2-eha | OK | OK | OK | OK | OK | OK | OK | OK | OK | SF | SF |
| 44 | 1 w % C8 + 2 w % 2-eha | OK | OK | OK | OK | OK | OK | TP | TP | TP | SF | SF |
| 45 | 2 w % C10b + 1 w % 2-eha | OK | OK | OK | OK | OK | OK | OK | OK | OK | OK | OK |
| 46 | 1 w % C10b + 2 w % 2-eha | OK | TP | TP | TP | TP | TP | TP | TP | TP | TP | TP |
| 47 | 2 w % C6b + 1 w % 2-eha | OK | OK | OK | OK | OK | OK | OK | OK | OK | OK | OK |
| 48 | 1 w % C6b + 2 w % 2-eha | OK | OK | OK | OK | OK | OK | OK | OK | OK | OK | OK |
| 49 | 2 w % BA + 1 w % 2-eha | OK | OK | OK | OK | OK | OK | OK | OK | OK | OK | OK |
| 50 | 1 w % BA + 2 w % 2-eha | OK | TP | TP | TP | TP | TP | TP | TP | TP | TP | TP |
| 51 | 2 w % PTBA + 1 w % 2-eha | OK | OK | OK | viscous | viscous | viscous | Solid | Solid | Solid | Solid | Solid |
| 52 | 1 w % PTBA + 2 w % 2-eha | OK | OK | OK | viscous | TP | TP | TP | TP | TP | TP | TP |
| 53 | 2 w % C8 + 1 w % TMHA | OK | OK | OK | OK | OK | OK | OK | OK | OK | OK | OK |
| 54 | 1 w % C8 + 2 w % TMHA | OK | OK | OK | OK | TP | TP | TP | TP | TP | TP | TP |
| 55 | 2 w % C10b + 1 w % TMHA | OK | OK | OK | OK | OK | OK | OK | OK | OK | OK | OK |
| 56 | 1 w % C10b + 2 w % TMHA | OK | OK | OK | OK | OK | OK | OK | OK | OK | OK | OK |
| 57 | 2 w % C6b + 1 w % TMHA | OK | OK | OK | OK | OK | OK | OK | OK | OK | OK | OK |
| 58 | 1 w % C6b + 2 w % TMHA | OK | OK | OK | OK | OK | TP | TP | TP | TP | TP | TP |
| 59 | 2 w % BA + 1 w % TMHA | OK | OK | OK | OK | OK | OK | OK | OK | OK | OK | OK |
| 60 | 1 w % BA + 2 w % TMHA | OK | OK | OK | OK | OK | OK | OK | OK | OK | OK | OK |
| 61 | 2 w % PTBA + 1 w % TMHA | OK | TP | TP | TP | TP | TP | Solid | Solid | Solid | Solid | Solid |
| 62 | 1 w % PTBA + 2 w % TMHA | OK | OK | OK | TP | TP | TP | TP | TP | TP | TP | TP |
| 63 | 2 w % 2-eha + 1 w % TMHA | OK | OK | OK | OK | OK | OK | OK | OK | OK | OK | OK |
| 64 | 1 w % 2-eha + 2 w % TMHA | OK | OK | OK | OK | OK | OK | OK | OK | OK | OK | OK |

TABLE 2-continued

| Ex. | Organic acid content | 20° C. | 10° C. | 5° C. | 0° C. | −5° C. | −10° C. | −15° C. | −20° C. | −25° C. | −30° C. | −35° C. |
|---|---|---|---|---|---|---|---|---|---|---|---|---|
| 65 | 3 w % Octanoic acid (C8) | SF | SF | SF | SF | SF | SF | SF | SF | solid | solid | solid |
| 66 | 3 w % 2-eha | TP | TP | MP | MP | MP | MP | MP | MH, MP | solid | solid | solid |
| 67 | 3 w % TMHA | traces | traces | MP | MP | MP | MP | MP | MH, MP | MP | solid | solid |
| 68 | 3 w % Sebacic acid (C10b) | traces | traces | TP | MP | MP | MP | MP | MH, MP | solid | solid | solid |
| 69 | 3 w % Adipic acid (C6b) | traces | traces | TP | MP | MP | MP | MP | MH, MP | solid | solid | solid |
| 70 | 3 w % Benzoic acid (BA) | traces | hazy | TP | MP | MP | MP | SP | MH, SP | solid | solid | solid |
| 71 | 3 w % PTBA | traces | TP | TP | TP | TP | MG | solid | solid | solid | solid | solid |
| 72 | 2 w % C8 + 1 w % 2-eha | SN | SF | SF | SF | SF | SF | SN | SN | solid | solid | solid |
| 73 | 1 w % C8 + 2 w % 2-eha | MN | SN | SF | SF | MP | SF | SF | SN | solid | solid | solid |
| 74 | 2 w % C10b + 1 w % 2-eha | TP | TP | TP | TP | MP | TP | SP | MH, MP | solid | solid | solid |
| 75 | 1 w % C10b + 2 w % 2-eha | TP | TP | TP | TP | SP | TP | SP | MH, MP | MP | solid | solid |
| 76 | 2 w % C6b + 1 w % 2-eha | TP | MP | TP | TP | SP | TP | SP | MH, SP | solid | solid | solid |
| 77 | 1 w % C6b + 2 w % 2-eha | TP | MP | TP | MF | SP | TP | SP | MH, SP | solid | solid | solid |
| 78 | 2 w % BA + 1 w % 2-eha | TP | MP | TP | MF | SP | MF | SP | MH, SP | MP | solid | solid |
| 79 | 1 w % BA + 2 w % 2-eha | TP | MP | TP | TP | SP | TP | SP | so | solid | solid | solid |
| 80 | 2 w % PTBA + 1 w % 2-eha | TP | TP | TP | TP | TP | TP | SN | solid | solid | solid | solid |
| 81 | 1 w % PTBA + 2 w % 2-eha | TP | TP | TP | MF | TP | MF | MP | MH, MP | solid | solid | solid |
| 82 | 2 w % C8 + 1 w % TMHA | SN | SN | SN | SN | SF | SN | SN | SN | SN | solid | solid |
| 84 | 1 w % C8 + 2 w % TMHA | TP | MP | SN | SN | SN | SN | SN | MF | solid | solid | solid |
| 84 | 2 w % C10b + 1 w % TMHA | TP | MP | TP | MF | MP | MF | SP | MH, SP | SP | solid | solid |
| 85 | 1 w % C10b + 2 w % TMHA | TP | TP | TP | MF | MP | MF | MP | MH, SP | solid | solid | solid |
| 86 | 2 w % C6b + 1 w % TMHA | TP | MP | TP | MP | MP | MF | SH | MH, MP | solid | solid | solid |
| 87 | 1 w % C6b + 2 w % TMHA | TP | MP | TP | MF | MP | MF | MP | MH, MP | solid | solid | solid |
| 88 | 2 w % BA + 1 w % TMHA | TP | MP | MF | MF | SP | MF | SH | solid | solid | solid | solid |
| 89 | 1 w % BA + 2 w % TMHA | TP | MP | MF | MF | SP | MF | SP | MH, SP | solid | solid | solid |
| 90 | 2 w % PTBA + 1 w % TMHA | traces | TP | TP | TP | TP | TP | TP | SH, SP | solid | solid | solid |
| 91 | 1 w % PTBA + 2 w % TMHA | traces | TP | TP | TP | TP | MF | SF | SF | solid | solid | solid |
| 92 | 2 w % 2-eha + 1 w % TMHA | TP | MP | MP | MP | MP | MP | SP | SH, SP | solid | solid | solid |
| 93 | 1 w % 2-eha + 2 w % TMHA | TP | MP | MP | MP | MP | MP | SP | SH, SP | solid | solid | solid |

The invention claimed is:

1. A method for increasing the thermal stability of an antifreeze composition which does not contain glycol, the method comprises the step of adding to a freezing point depressant matrix a corrosion inhibitor system comprising: a) 0.01 to 10 wt. % of at least a branched organic acid (C5-C16) or alkali- or amino salt of a branched organic acid (C5-C16); and b) 0.01 to 10 wt % of i) an aliphatic mono acid (C5-C12) or alkali- or amino salt of an aliphatic mono acid (C5-C12); or ii) an aromatic organic acid (C7-C18) or alkali- or amino salt of an aromatic organic acid (C7-C18); iii) a substituted aromatic organic acid (C7-C18) or alkali- or amino salt of a substituted aromatic organic acid, and wherein the freezing point depressant matrix comprises at least one of potassium acetate, potassium formate, potassium formate, potassium propionate, dipotassium adipinate, and mixtures thereof.

2. The method of claim 1, wherein the branched organic acid (C5-C16) or salt is selected from the group consisting of isobutanoic acid, 2-ethylhexanoic acid, isononanoic acid, 3,5,5-trimethylhexanoic acid, and mixtures thereof.

3. The method of claim 1, wherein the aromatic organic acid or substituted aromatic organic acid (C7-C18) or salt is selected from o-, m- and p-methylbenzoic acids; p-tert-butylbenzoic acid; o-, m- and p-methoxybenzoic acids; o-, m- or p-hydroxybenzoic acid; o-, m- or p-fluorobenzoic acids, o-, m- and p-nitrobenzoic acids and mixtures thereof.

4. The method of claim 1, wherein the aliphatic mono acid (C5-C12) or salt is selected from the group consisting of heptanoic acid, octanoic acid, nonanoic acid, decanoic acid, undecanoic acid, dodecanoic acid, and neodecanoic acid, and mixtures thereof.

* * * * *